United States Patent
Tsugawa (10) Patent No.: US 8,508,900 B2
(45) Date of Patent: Aug. 13, 2013

(54) OVERVOLTAGE PROTECTION CIRCUIT AND ELECTRONIC DEVICE COMPRISING THE SAME

(75) Inventor: Syuichi Tsugawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 352 days.

(21) Appl. No.: 12/332,929

(22) Filed: Dec. 11, 2008

(65) Prior Publication Data
US 2009/0154039 A1 Jun. 18, 2009

(30) Foreign Application Priority Data
Dec. 14, 2007 (JP) .................. 2007-323827

(51) Int. Cl.
H02H 3/20 (2006.01)
H02H 9/04 (2006.01)
H02H 7/00 (2006.01)
H02H 9/00 (2006.01)

(52) U.S. Cl.
USPC ............................. 361/91.1; 361/18

(58) Field of Classification Search
USPC .................. 361/91.5, 91.1, 18, 111
See application file for complete search history.

(56) References Cited

U.S. PATENT DOCUMENTS
6,606,227 B2 * 8/2003 Rapsinski et al. ............. 361/86
2003/0214769 A1 11/2003 Nishikawa et al.

FOREIGN PATENT DOCUMENTS

| JP | U-H03-091100 | 9/1991 |
|---|---|---|
| JP | 11 018280 A | 1/1999 |
| JP | A-2002-218645 | 2/2002 |
| JP | A-2003-303890 | 10/2003 |
| JP | 2004-229365 | 8/2004 |

OTHER PUBLICATIONS

Japanese Office Action (Notice of Reasons for Rejection) issued for Japanese Patent Application No. 2007-323827, dated Sep. 6, 2012 (with translation).
European Search Report issued in European Application EP 0802 1540 dated Feb. 14, 2013.

* cited by examiner

Primary Examiner — Rexford Barnie
Assistant Examiner — Christopher Clark
(74) Attorney, Agent, or Firm — Nixon & Vanderhye P.C.

(57) ABSTRACT

An overvoltage protection circuit prevents a voltage higher than an allowable voltage value from being supplied to a predetermined to-be-protected circuit. A voltage is applied from outside to an input end 11. A cathode terminal of a zener diode 13 is connected to the input end 11. A first resistance element 14 is connected between an anode terminal of the zener diode 13 and a ground terminal. A voltage detection integrated circuit 15 detects a voltage between both ends of the zener diode 13, and outputs a detection signal that indicates whether or not the detected voltage is higher than the allowable voltage value. When the detection signal indicates that the detected voltage is no higher than the allowable voltage value, a MOSFET 16 supplies the to-be-protected circuit with the voltage applied to the input end 11. When the detection signal indicates that the detected voltage is higher than the allowable voltage value, the MOSFET 16 ceases the supply, to the to-be-protected circuit, of the voltage applied to the input end 11.

8 Claims, 3 Drawing Sheets

OVERVOLTAGE PROTECTION CIRCUIT AND ELECTRONIC DEVICE COMPRISING THE SAME

The disclosure of Japanese Patent Application No. 2007-323827, filed Dec. 14, 2007, is incorporated herein by reference.

BACKGROUND OF THE INVENTION

1. Field of the Invention

The present invention relates to an overvoltage protection circuit and an electronic device comprising the overvoltage protection circuit. More particularly, the present invention relates to an overvoltage protection circuit capable of preventing an overvoltage from being applied from a power source to a circuit included in an electronic device or the like, and relates to an electronic device including the overvoltage protection circuit.

2. Description of the Background Art

Conventionally, there have been overvoltage protection circuits for preventing voltage from being oversupplied to a circuit from a power source such as an AC adaptor or the like. For example, Japanese Laid-Open Patent Publication No. 2004-229365 (hereinafter, referred to as Patent Document 1) discloses an overvoltage protection circuit (a voltage-limiting circuit) for protecting a circuit from overvoltage. The overvoltage protection circuit has a voltage limiter for limiting voltage at both ends thereof to a predetermined voltage value. By connecting a circuit to be protected (to-be-protected circuit) and the voltage limiter in parallel, the overvoltage protection circuit prevents a voltage, which is no lower than the voltage at both the ends of the voltage limiter, from being applied to the to-be-protected circuit.

Since the voltage limiter in the overvoltage protection circuit disclosed in Patent Document 1 is structured with such an element as a diode or the like, it is difficult to precisely set a limit voltage value. In order to improve the precision in setting the limit voltage value for the above overvoltage protection circuit, it is conceivable to incorporate, into the overvoltage protection circuit, a voltage detection integrated circuit for detecting a value of a voltage supplied to the to-be-protected circuit. To be specific, the value of the voltage supplied to the to-be-protected circuit is detected by the voltage detection integrated circuit, and in accordance with a result of the detection, whether to limit (or cease) or allow the supply of the voltage is controlled. However, the voltage detection integrated circuit is not capable of enduring overvoltage. For this reason, if the voltage detection integrated circuit is simply incorporated into the over voltage protection circuit, the voltage detection integrated circuit is destroyed due to an overvoltage supplied thereto, which finally leads to failure to securely prevent an overvoltage from being supplied to the to-be-protected circuit.

SUMMARY OF THE INVENTION

Therefore, an object of the present invention is to provide an overvoltage protection circuit capable of securely preventing, by using a voltage detection integrated circuit, an overvoltage from being supplied to a to-be-protected circuit, and to provide an electronic device comprising the overvoltage protection circuit.

The present invention has the following features to achieve the object mentioned above. Note that, reference numerals, supplementary descriptions and the like indicated between parentheses in this section are merely provided to facilitate the understanding of the present invention in relation to the later-described embodiment, rather than limiting the present invention in any way.

A first aspect of the present invention is an overvoltage protection circuit (3) for preventing a voltage higher than an allowable voltage value from being supplied to a predetermined to-be-protected circuit. The overvoltage protection circuit comprises an input end (11), voltage drop means (zener diode 13), first resistance means (first resistance element 14), a voltage detection integrated circuit (voltage detection integrated circuit 15) and switching means (MOSFET 16). A voltage is applied to the input end from outside. The voltage drop means whose one end is connected to the input end causes, when a voltage no lower than a predetermined limit voltage value (i.e., no lower than a breakdown voltage value of the zener diode 13) is applied to both ends of the voltage drop means, a voltage drop by the predetermined limit voltage value. The first resistance means is connected between another end of the voltage drop means and a ground terminal, and causes a voltage drop by a value of a voltage applied to both ends of the first resistance means. The voltage detection integrated circuit detects a voltage between both the ends of the voltage drop means, and outputs a detection signal which indicates whether or not the detected voltage is higher than the allowable voltage value. When the detection signal indicates that the detected voltage is no higher than the allowable voltage value, the switching means supplies the to-be-protected circuit with the voltage applied to the input end, and when the detection signal indicates that the detected voltage is higher than the allowable voltage value, the switching means ceases a supply, to the to-be-protected circuit, of the voltage applied to the input end.

In a second aspect of the present invention, the predetermined limit voltage value may be set to be greater than the allowable voltage value and to be no greater than a withstanding voltage of the voltage detection integrated circuit.

In a third aspect or the present invention, the voltage drop means may be a zener diode.

In a fourth aspect of the present invention, when the detected voltage is no higher than the allowable voltage value, the voltage detection integrated circuit may output a lower voltage than a voltage value at the input end, and when the detected voltage is higher than the allowable voltage value, the voltage detection integrated circuit may output a voltage equal to the voltage value at the input end. In this case, the switching means, whose control terminal is connected to an output end of the voltage detection integrated circuit, causes the input end and an output end of the overvoltage protection circuit, which output end is connected to the to-be-protected circuit, to be in a state of conductivity with each other when a voltage at the control terminal is lower than the voltage at the input end, and causes the input end and the output end of the overvoltage protection circuit to be in a state of nonconductivity with each other when the voltage at the control terminal is equal to the voltage at the input end.

In a fifth aspect of the present invention, when the detected voltage is no higher than the allowable voltage value, the voltage detection integrated circuit may output a lower voltage than a voltage value at the input end, and when the detected voltage is higher than the allowable voltage value, the voltage detection integrated circuit may cause an output thereof to be in an open state. In this case, the switching means, whose control terminal is connected to an output end of the voltage detection integrated circuit, causes the input end and an output end of the overvoltage protection circuit, which output end is connected to the to-be-protected circuit, to be in a state of conductivity with each other when a voltage at the control terminal is lower than the voltage at the input end, and causes the input end and the output end of the overvoltage protection circuit to be in a state of nonconductivity with each other when the voltage at the control terminal is equal to the voltage at the input end. The overvoltage protection circuit further comprises second resistance means (second resistance element 22) which is connected between the input end of the overvoltage protection circuit and the output end of the voltage detection integrated circuit and which causes a voltage drop in accordance with a magnitude of an electric current flowing on the second resistance means.

In a sixth aspect of the present invention, the switching means may be a field effect transistor (MOSFET 16).

The above aspects may be implemented in the form of electronic devices respectively comprising the overvoltage protection circuits of the above first to sixth aspects.

According to the first aspect, in the case where the voltage applied to the input end is lower than the limit voltage value, the applied voltage can be precisely detected by the voltage detection integrated circuit. This makes it possible to precisely determine whether or not the applied voltage is higher than the allowable voltage value, and to securely prevent a voltage higher than the allowable voltage value from being supplied to the to-be-protected circuit. On the other hand, in the case where the voltage applied to the input end is no lower than the limit voltage value, the voltage at both the ends of the voltage drop means is limited to the limit voltage value. Accordingly, voltage applied to both ends of the voltage detection integrated circuit is no higher than the limit voltage value. This prevents a destruction of the voltage detection integrated circuit. As described above, according to the first aspect, the overvoltage protection circuit using the voltage detection integrated circuit can be realized; the voltage detection integrated circuit is protected; and an overvoltage is securely prevented from being supplied to the to-be-protected circuit.

According to the second aspect, the limit voltage value is set to be greater than the allowable voltage value. Therefore, the voltage detection integrated circuit is able to detect the voltage at least up to the greater voltage value than the allowable voltage value, and precisely determine whether or not the applied voltage is higher than the allowable voltage value. Further, since the limit voltage value is set to be no greater than the withstanding voltage of the voltage detection integrated circuit, the voltage detection integrated circuit is securely protected from overvoltage.

According to the third aspect, by using the zener diode as the voltage drop means, the overvoltage protection circuit can be structured with a simple structure.

According to the fourth aspect, by using the voltage detection integrated circuit of the so-called totem-pole output type, the overvoltage protection circuit can be structured with a simple structure.

According to the fifth aspect, by using the voltage detection integrated circuit of the so-called open-output type, the overvoltage protection circuit can be structured with a simple structure. By connecting the second resistance means between the input end of the overvoltage protection circuit and the output end of the voltage detection integrated circuit, a voltage at the output end of the voltage detection integrated circuit and the applied voltage can be equalized in the case where the output end of the voltage detection integrated circuit becomes an open state. This prevents operations of the circuit from becoming unstable.

According to the sixth aspect, by using the field effect transistor as the switching means, loss in output to the to-be-protected circuit can be reduced when the voltage applied to the input end is supplied to the to-be-protected circuit.

According to the seventh aspect, by including the overvoltage protection circuit in the electronic device, a breakdown of the electronic device can be prevented when an overvoltage is inputted thereto.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
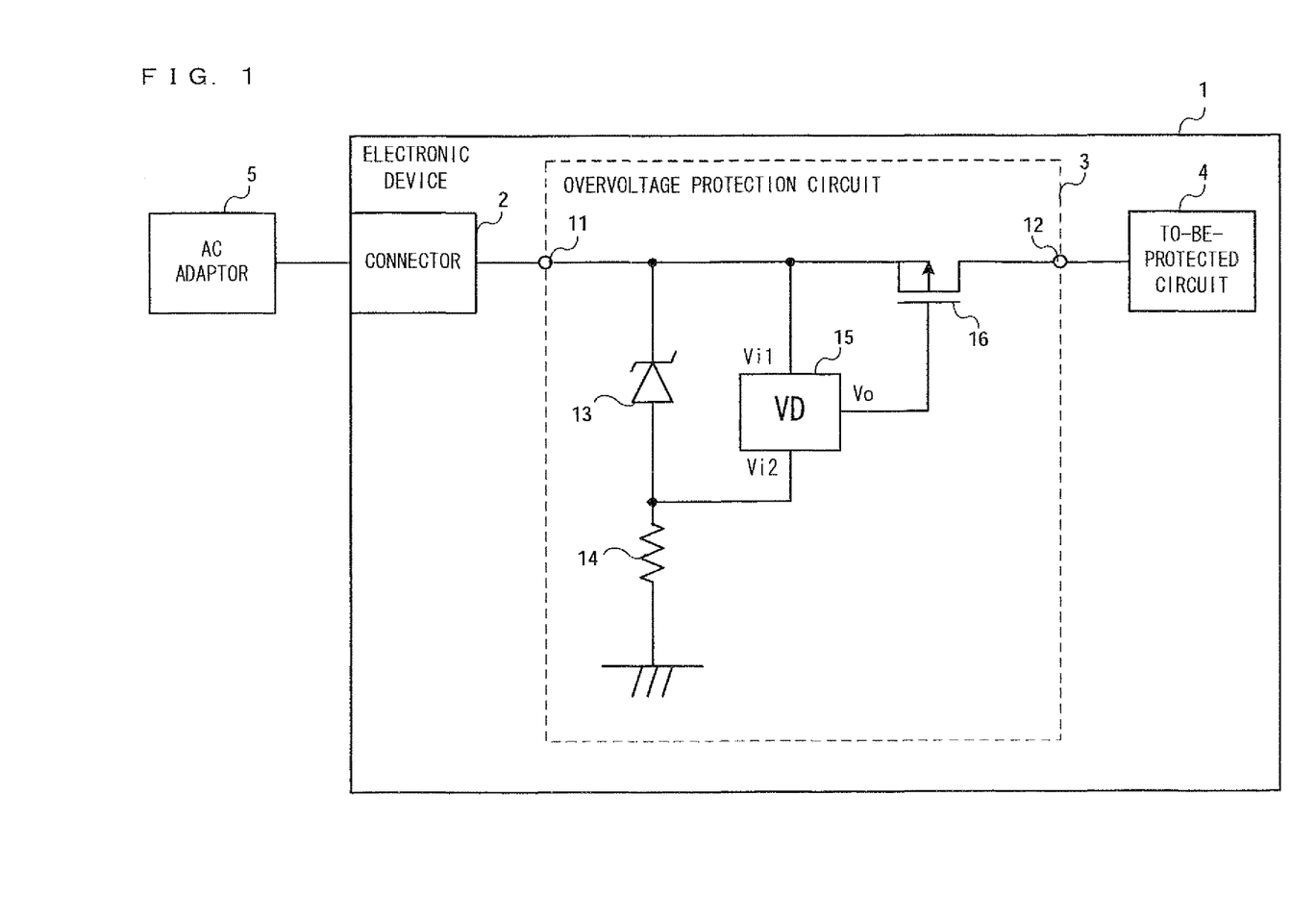
FIG. 1 shows structures of an overvoltage protection circuit and an electronic device according to an embodiment of the present invention.

Hereinafter, an overvoltage protection circuit and an electronic device comprising the overvoltage protection circuit, according to an embodiment of the present invention, will be described with reference to FIG. 1. FIG. 1 shows a structure of the overvoltage protection circuit and the electronic device according to the present embodiment. In FIG. 1, an electronic device 1 comprises a power source connector 2, an overvoltage protection circuit 3 and a to-be-protected circuit 4. Also, an AC adaptor 5 for supplying power to the electronic device 1 is connected to the electronic device 1 in a detachable manner. Although the electronic device 1 is typically a portable electronic device such as a handheld game apparatus, mobile phone, laptop PC, digital camera or the like, the electronic device 1 may be any type of device as long as the device is supplied with power from outside via the AC adaptor 5. The electronic device may be a stationary electronic device.

(Brief Description of the Electronic Device 1)

As shown in FIG. 1, the AC adaptor 5 is connected to the power source connector 2 in a detachable manner. Within the electronic device 1, the power source connector 2 is connected to the to-be-protected circuit 4 via the overvoltage protection circuit 3. This allows the power, which is supplied from the AC adaptor 5, to be supplied to the to-be-protected circuit 4 via the power source connector 2 and the overvoltage protection circuit 3. The to-be-protected circuit 4 is an integrated circuit which performs predetermined signal processing and information processing. The processing performed by the to-be-protected circuit 4 may be any processing as long as the to-be-protected circuit operates using the power supplied from the AC adaptor 5. Here, an upper limit value of a voltage that is allowed to be supplied from the AC adaptor 5 to the to-be-protected circuit 4, is referred to as an allowable voltage value. The allowable voltage value is set to such a value as to allow the to-be-protected circuit 4 to operate without being destroyed. It is assumed in the description of the present embodiment below that the allowable voltage value of the to-be-protected circuit 4 is, e.g., 6[V].

Here, in the case where the AC adaptor 5 breaks down, or where the AC adaptor 5, which is not assumed to be connected to the electronic device 1 (e.g., an AC adaptor intended for a product other than the electronic device 1, or an AC adaptor having poor quality), is connected to the electronic device 1, there is a possibility that a voltage higher than the allowable voltage value (i.e., an overvoltage) is supplied to the electronic device 1 from the AC adaptor 5. If, in this case, the overvoltage is directly supplied to the to-be-protected circuit 4, the to-be-protected circuit 4 is destroyed, and the electronic device 1 breaks down, accordingly. For this reason, as shown in FIG. 1, the overvoltage protection circuit 3 is connected between the power source connector 2 and the to-be-protected circuit 4. The overvoltage protection circuit 3 is provided for the purpose of preventing the overvoltage from being supplied to the to-be-protected circuit 4. Hereinafter, the overvoltage protection circuit 3 will be described.

(Structure of the Overvoltage Protection Circuit 3)

As shown in FIG. 1, the overvoltage protection circuit 3 comprises an input end 11, an output end 12, a zener diode 13, a first resistance element 14, a voltage detection integrated circuit (referred to as a "VD" (Voltage Detector) in FIG. 1) 15 and a MOSFET 16. The input end 11 is connected to the power source connector 2. A cathode terminal of the zener diode 13 is connected to the input end 11. One end of the first resistance element 14 is connected to an anode terminal of the zener diode 13, and the other end of the first resistance element 14 is grounded. As will hereinafter be described in detail, the zener diode 13 and the first resistance element 14 have a function to prevent, when an overvoltage is applied, the overvoltage from being applied to the voltage detection integrated circuit 15, by dividing the voltage applied to the input end 11.

The voltage detection integrated circuit 15 has two input terminals, i.e., a voltage input terminal and a ground terminal, and one voltage output terminal. The input terminals of the voltage detection integrated circuit 15 are respectively connected to both ends of the zener diode 13. To be specific, the voltage input terminal is connected to the input end 11 (i.e., connected to the cathode terminal of the zener diode 13), and the ground terminal is connected between the zener diode 13 and the first resistance element 14 (i.e., connected to the anode terminal of the zener diode 13). The voltage detection integrated circuit 15 detects a voltage value of voltage inputted thereto, and outputs a detection signal which indicates whether or not the detected voltage value is greater than a predetermined reference voltage value. Here, the reference voltage value is set to an equal value to the aforementioned allowable voltage value of the to-be-protected circuit 4 (i.e., 6[V])). To be specific, the voltage detection integrated circuit 15 detects a voltage between both the ends of the zener diode 13, and outputs the detection signal which indicates whether or not the detected voltage is higher than the allowable voltage value.

Note that, the voltage detection integrated circuit 15 is an integrated circuit and has an upper limit value for an input voltage (i.e., withstanding voltage) at or below which the voltage detection integrated circuit 15 is able to operate (i.e., at or below which the voltage detection integrated circuit 15 is not destroyed). It is assumed in the description of the present embodiment below that the withstanding voltage of the voltage detection integrated circuit 15 is 10[V]. In other words, in the present embodiment, used as the voltage detection integrated circuit 15 is a circuit which outputs different results based on whether or not the voltage inputted thereto is higher than 6[V] and to which a voltage no higher than 10[V] can be inputted.

Also, in the present embodiment, the voltage detection integrated circuit 15 is of the so-called totem-pole output type. To be specific, when the detected voltage is higher than the reference voltage value (i.e., higher than the allowable voltage value), the voltage detection integrated circuit 15 outputs, as a detection signal, a Low level voltage (a voltage at the ground terminal side of the voltage detection integrated circuit 15), and when the detected voltage is no higher than the reference voltage value, the voltage detection integrated circuit 15 outputs, as a detection signal, a High level voltage (a voltage at the voltage input terminal side).

Meanwhile, the MOSFET 16 is connected between the input end 11 and the output end 12. To be specific, the MOSFET 16 is a P-type MOSFET whose source terminal is connected to the input end 11 and whose drain terminal is connected to the output end 12. Further, a gate terminal of the MOSFET 16 is connected to the voltage output terminal of the voltage detection integrated circuit 15. As will hereinafter be described in detail, the MOSFET 16 functions as switching means for opening or closing a connection between the input end 11 and the output end 12 in accordance with the detection signal provided from the voltage detection integrated circuit 15. The output end 12 is connected to the to-be-protected circuit 4.

(Requirements for the Zener Diode 13 and the First Resistance Element 14)

Described next are requirements which the zener diode 13 and the first resistance element 14 in the overvoltage protection circuit 3 structured as shown in FIG. 1 need to satisfy. First, as a requirement to be satisfied by the zener diode 13, a breakdown voltage of the zener diode 13 is set to be higher than the allowable voltage value (6[V]) of the to-be-protected circuit 4 and no higher than the withstanding voltage (10[V]) of the voltage detection integrated circuit 15. The reason for setting the breakdown voltage to be higher than the allowable voltage value as to enable the voltage detection integrated circuit 15 to detect that a voltage higher than the allowable voltage value has been applied to the input end 11. Also, the reason for setting the breakdown voltage to be no higher than the withstanding voltage is to prevent a higher voltage than the withstanding voltage from being inputted to the voltage detection integrated circuit 15.

Further, as a first requirement to be satisfied by the first resistance element 14, a resistance value of the first resistance element 14 is set such that a product of an electric current, which flows from the ground terminal of the voltage detection integrated circuit 15, and the resistance value, that is, a value of a voltage between both ends of the first resistance element 14 when there is no electric current flowing into the zener diode 13, is at least smaller than a detection error of the voltage detection integrated circuit 15 (preferably, no greater than $\frac{1}{10}$ of the detection error). This is because since, in the present embodiment, the voltage detection integrated circuit 15 detects a voltage between bosh the ends of the zener diode 13, the voltage detection integrated circuit 15 cannot detect the voltage applied to the input end 11 if the voltage between both the ends of the first resistance element 14 is high when there is no electric current flowing into the zener diode 13. Note that, the detection error of the voltage detection integrated circuit 15 is determined based on a detection precision of the voltage detection integrated circuit 15 and the allowable voltage value. As described above, the present embodiment takes into account that an electric current flowing on the voltage detection integrated circuit is very small which is tens of μA at a maximum, and sets the resistance value of the first resistance element 14 such that the voltage between both the ends of the zener diode 13 and the voltage applied to the input end 11 can be seen as (almost) equal to each other. To be specific, in the case where the voltage applied to the overvoltage protection circuit of the present embodiment is no higher than the allowable voltage value (i.e., no higher than the breakdown voltage of the zener diode 13), almost no electric currant flows into the zener diode 13, and only the electric current flowing on the voltage detection integrated circuit 15 flows into the first resistance element 14. For this reason, in this case, by setting the resistance value of the first resistance element 14 such that the voltage between both the ends of the first resistance element 14 is at a negligible level for the detection precision of the voltage detection integrated circuit 15, the voltage between both the ends of the zener diode 13 and the voltage applied to the input end 11 can be seen as (almost) equal to each other.

To be specific, consider an exemplary case where the detection precision of the voltage detection integrated circuit 15 is ±2% and the electric current flowing from the ground terminal of the voltage detection integrated circuit 15 is 0.9 [μA]. In this case, the detection error in relation to the reference voltage value (6[V]) is 6[V]×±0.02=±120 [mV]. Accordingly, a substantially smaller value than 120 [mV] (e.g., no greater than 1/10 of the detection error) is acceptable as a value of the voltage between both the ends of the first resistance element 14. For example, if the resistance value of the first resistance element 11 is set to 4.7 [kΩ], the value of the voltage between both the ends of the first resistance element 14 is 4.7 [kΩ]×0.9 [μA]=4.23 [mV], which is no greater than 1/10 of the above detection error and which is substantially small. In this manner the resistance value can be set to an appropriate value.

As described above, the resistance value of the first resistance element 14 is required to be set such that the resistance value is not as large as the one which causes the voltage between both the ends of the first resistance element 14 to be too large. However, if the resistance value of the first resistance element 14 is set to be too small, a large amount of electric current flows into the zener diode 13 and the first resistance element 14 when an overvoltage is applied. This possibly destroys the zener diode 13 and the first resistance element 14. Therefore, it is necessary to set the resistance value of the first resistance element 14 so as not to be as small as the one which causes the electric current flowing into the zener diode 13 and the first resistance element 14 to be too large.

To be specific, as a second requirement which the first resistance element 14 is preferred to satisfy in addition to the above-described first requirement, the resistance value of the first resistance element 14 is set as described below for the purpose of preventing the destruction of the zener diode 13 and the first resistance element 14. When a voltage, which is an assumable maximum voltage to be applied to the input end 11, is applied to the input end 11, a voltage, whose magnitude is a result of subtracting the breakdown voltage of the zener diode 13 from the assumable maximum voltage, is applied to the first resistance element 14. Then, an electric current corresponding to the resistance value of the first resistance element 14 flows into the first resistance element 14. Further, (almost) the same electric current flows into the zener diode 13. Here, it is necessary to set the resistance value of the first resistance element 14 such that power consumption at the zener diode 13 and power consumption at the first resistance element 14 each fall within an absolute maximum rated power (preferably, within a rated power) thereof. For example, when it is assumed that the voltage applied to the input end 11 is 25[V] at a maximum, a circuit that satisfies the above requirements can be realized by using a zener diode whose rated Dower is 150 [mW] and whose breakdown voltage is 8.2[V] and using a resistor whose rated power is 62.5 [mW] and whose resistance value is aforementioned 4.7 [kΩ].

(Operations of the Overvoltage Protection Circuit 3)

Next, operations of the above-structured overvoltage protection circuit 3 will be described. First, a case where the voltage supplied from the AC adaptor 5 is a normal value, i.e., a case where the voltage no higher than the allowable voltage value (6[V]) is applied to the input end 11, is described. In this case, a value of a voltage Vi1 at a voltage input end of the voltage detection integrated circuit 15 is a value of the voltage applied to the input end 11 (hereinafter, referred to as an input end voltage value). Further, since the voltage between both the ends of the first resistance element 14 is negligible as described above, a voltage Vi2 at the ground terminal of the voltage detection integrated circuit 15 is almost 0[V]. To be specific, the voltage equal to the input end voltage value is inputted to the voltage detection integrated circuit 15, and the voltage detection integrated circuit 15 detects a magnitude of the input end voltage value. Note that, in this case, since the input end voltage value is smaller than the breakdown voltage of the zener diode 13, an electric current does not flow into the zener diode 13.

In the above case, the voltage detection integrated circuit 15 outputs, from the voltage output terminal, a detection signal indicating that the detected voltage value (the input end voltage value) is no greater than the allowable voltage value. In other words, a voltage Vo at the voltage output terminal becomes Low level (=0[V]). Accordingly, a negative voltage for the source terminal of the P-type MOSFET 16 is applied to the gate terminal thereof, whereby the source terminal and the drain terminal thereof are caused to be in a state of conductivity with each other (i.e., the switch becomes an open state). As a result, the voltage at the output end 12 becomes the input end voltage value, and is supplied from the output end 12 to the to-be-protected circuit 4. As described above, when the voltage supplied from the AC adaptor 5 is a normal value, the overvoltage protector circuit 3 supplies the to-be-protected circuit 4 with the voltage supplied from the AC adaptor 5, without changing the voltage.

Described next is a case where the voltage supplied from the AC adaptor 5 is not a normal value, i.e., a case where a voltage higher than the allowable voltage value is applied to the input end 11. Here, when the value of the voltage applied to the input end 11 (input end voltage value) is smaller than the breakdown voltage (8.2[V]) of the zener diode 13, a voltage equal to the input end voltage value is inputted to the voltage detection integrated circuit 15, similarly to the case where the voltage supplied from the AC adaptor 5 is a normal value (also in this case, the electric current flowing into the first resistance element 14 is only the electric current from the voltage detection integrated circuit 15; therefore, the voltage between both the ends of the first resistance element 14 is negligible). On the other hand, when the input end voltage value is no smaller than the breakdown voltage (8.2[V]) of the zener diode 13, an electric current flows into the zener diode 13, and the voltage between both the ends of the zener diode 13 has an equal value to that of the breakdown voltage. Accordingly, in this case, the voltage equal to the breakdown voltages is inputted to the voltage detection integrated circuit 15. As described above, even if the higher voltage than the allowable voltage value is applied to the input end 11, the voltage inputted to the voltage detection integrated circuit 15 is not higher than the breakdown voltage. In other words, even if the input end voltage value is greater than the withstanding voltage of the voltage detection integrated circuit 15, a higher voltage than the breakdown voltage is not inputted to the voltage detection integrated circuit 15, because of the zener diode 13 connected in parallel to the voltage detection integrated circuit 15. Thus, according to the present embodiment, a higher voltage than the withstanding voltage of the voltage detection integrated circuit 15 is not inputted to the voltage detection integrated circuit 15, whereby a destruction of the voltage detection integrated circuit 15 is prevented.

Further, in the case where the voltage supplied from the AC adaptor 5 is not a normal value, since a voltage higher than the allowable voltage value is inputted to the voltage detection integrated circuit 15, the voltage detection integrated circuit 15 outputs, from the voltage output terminal, a detection signal indicating that the detected voltage value is greater than the allowable voltage value. In other words, the voltage Vo at the voltage output terminal becomes High level (i.e., the voltage Vo has an equal voltage value to the input end voltage value). Accordingly, the voltage, which is almost the same as that applied to the source terminal of the P-type MOSFET 16, is applied to the gate terminal thereof, whereby the source terminal and the drain terminal thereof are caused to be in a state of nonconductivity with each other (i.e., the switch becomes a closed state). As a result, the voltage is not supplied to the to-be-protected circuit 4 from the output end 12. Thus, when the voltage supplied from the AC adaptor 5 is not a normal value, the overvoltage protection circuit 3 does not supply the to-be-protected circuit 4 with the voltage supplied from. the AC adaptor 5. Accordingly, an overvoltage, which is higher than the allowable voltage value, is not supplied to the to-be-protected circuit 4. In this manner, the overvoltage protection circuit 3 protects the to-be-protected circuit 4 from the overvoltage As described above, in the present embodiment, in the case where a voltage higher than the allowable voltage value is supplied from the AC adaptor 5, the overvoltage protection circuit 3 ceases the voltage supply to the to-be-protected circuit 4, whereby the to-be-protected circuit is protected from overvoltage. Further, since the voltage detection integrated circuit 15, which detects the magnitude of the voltage supplied from the AC adaptor 5, is used in the overvoltage protection circuit 3, the value of the voltage supplied from the AC adaptor 5 can be precisely detected. This makes it possible to precisely determine whether or not a voltage higher than the allowable voltage value is being supplied from the AC adaptor 5.

Further, in the present embodiment, by connecting the zener diode 13 to the voltage detection integrated circuit 15 in parallel, a voltage higher than the withstanding voltage of the voltage detection integrated circuit 15 is prevented from being inputted no the voltage detection integrated circuit 15, whereby a destruction of the voltage detection integrated circuit 15 can be prevented. In other words, according to the present embodiment, the voltage detection integrated circuit 15 can be safely used in the overvoltage protection circuit 3. Still further, according to the present embodiment, since the voltage detection integrated circuit 15 can be protected from overvoltage, it is not necessary to use, as the voltage detection integrated circuit, an expensive circuit having a high withstanding voltage. This allows the overvoltage protection circuit to be realized at a low cost.

As described above, according to the present embodiment, the overvoltage protection circuit, which has a sate structure using the voltage detection integrated circuit, can be realized. Further, since the value of the supplied voltage can be precisely detected, an overvoltage is securely prevented from being supplied to the to-be-protected circuit.

Still further, the above embodiment describes the structure in which the voltage detection integrated circuit 15 is protected from overvoltage by using the zener diode 13. Here, a conceivable structure, in which the voltage detection integrated circuit 15 is protected from overvoltage, is the one in which the voltage applied to the input end 11 is divided by multiple resistance elements. To be specific, the multiple resistance elements are connected in series between the input end 11 and a ground potential part, and the voltage detection integrated circuit 15 detects a voltage divided by the multiple resistance elements. In the structure in which the multiple resistance elements divide the voltage, a voltage inputted to the voltage detection integrated circuit 15 is lower than the voltage applied to the input end 11 due to the voltage dividing. As a result, a voltage of a detection signal to be outputted has a smaller value than that of the voltage applied to the input end 11. For this reason, the switching means (MOSFET 16) cannot be controlled by directly using the detection signal outputted from the voltage detection integrated circuit 15 (i.e., the detection signal from the voltage detection integrated. circuit 15 cannot be directly inputted to the gate terminal of the MOSFET 16). Accordingly, in the structure in which the multiple resistance elements divide the voltage, it is necessary to have a circuit which generates, using the detection signal, a signal to be inputted to the gate terminal of the MOSFET. This causes a circuit structure to be complex. On the other hand, in the above embodiment, the detection signal outputted from the voltage detection integrated circuit 15 can be directly used as an input to the gate terminal of the MOSFET. This allows a circuit structure to be simplified.

(First Variation)

Figure 2:
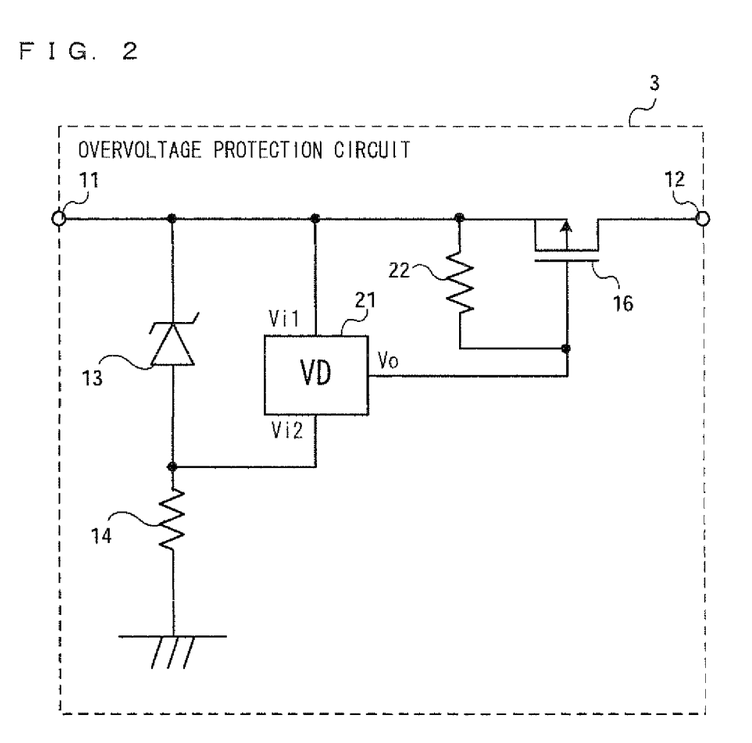
FIG. 2 shows a structure of an overvoltage protection circuit according to a first variation.

Next, a first variation of the above embodiment will be described. In the above embodiment, the voltage detection integrated circuit is of the totem-pole output type. However, in other embodiments, the voltage detection integrated circuit may be of the open-output type. FIG. 2 shows a structure of the overvoltage protection circuit 3 according to the first variation. Note that, in FIG. 2, the same components as those shown in FIG. 1 are denoted by the same reference numerals as those used in FIG. 1, and the detailed descriptions thereof will be omitted. Hereinafter, the overvoltage protection circuit of the first variation will be described with a focus on a difference between the above-described embodiment and the first variation.

As shown in FIG. 2, the overvoltage protection circuit 3 according to the first variation comprises a voltage detection integrated circuit 21 of the open-output type instead of the voltage detection integrated circuit 15 of the totem-pole output type. In the case where the detected voltage is no higher than the reference voltage value (allowable voltage value), the voltage detection integrated circuit 21 outputs a Low-level voltage as a detection signal, and in the case where the detected voltage is higher than the reference voltage value, the voltage detection integrated circuit 21 causes the voltage output terminal to be in an open state.

Further, the overvoltage protection circuit 3 in the first variation comprises a second resistance element 22. The second resistance element 22 connects the input end 11 and the voltage output terminal of the voltage detection integrated circuit 21. The second resistance element 22 is used as a so-called pull-up resistor in order to set, when the voltage output terminal of the voltage detection integrated circuit 21 becomes an open state, the voltage at the voltage output terminal to be equal to the voltage at the input end 11. To be specific, in the first variation, since the voltage detection integrated circuit 21 is an open-output circuit, the voltage output terminal becomes an open state when the voltage detected by the voltage detection integrated circuit 21 is higher than the allowable voltage value. Under these circumstances, the voltage at the voltage output terminal becomes unstable, which causes unstable operations of the circuit. For this reason, in the first variation, the input end 11 and the voltage output terminal of the voltage detection integrated circuit 21 are connected by the second resistance element 22 in order to equalize the voltage at the voltage output terminal and the voltage at the input end 11, whereby the voltage at the voltage output terminal is prevented from being unstable. To be specific, when the voltage detected by the voltage detection integrated circuit 21 is higher than the allowable voltage value, the second resistance element 22 allows the voltage Vo at the voltage output terminal to be equal to the voltage at the input end 11, similarly to the above-described embodiment. Accordingly, also in the first variation, the overvoltage protection circuit 3 operates in a similar manner to that of the above-described embodiment.

As described above, in the present invention, the voltage detection integrated circuit may be of the totem-pole output type or the open-output type. Note that, in the case of using the voltage detection integrated circuit of the open-output type, it is preferred that, as shown in FIG. 2, a resistance element, which connects the input end and the voltage output terminal of the voltage detection integrated circuit, is provided.

(Second Variation)

Figure 3:
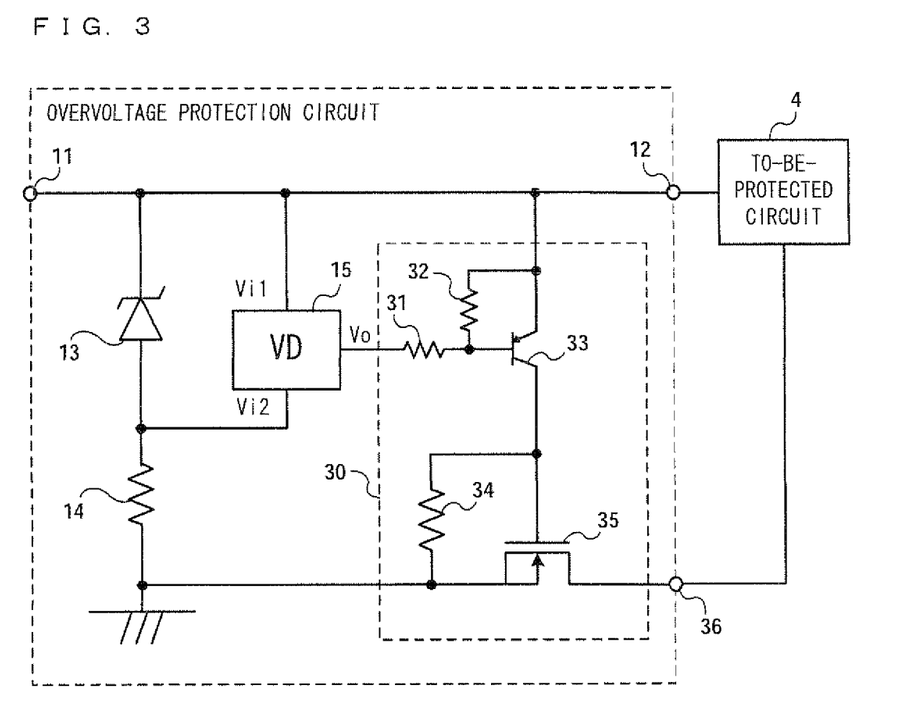
FIG. 3 shows a structure of an overvoltage protection circuit according to a second variation.

Next, a second variation of the above-described embodiment will be described. In the above embodiment, the P-type MOSFET 16 is used as switching means for opening and closing the connection between the input end 11 and the output end 12. However, in other embodiments, an N-type MOSFET may be used as the switching means instead. FIG. 3 shows a structure of the overvoltage protection circuit 3 according to the second variation. Note that, in FIG. 3, the same components as those shown in FIG. 1 are denoted by the same reference numerals as those used in FIG. 1, and the detailed descriptions thereof will be omitted. Hereinafter, the overvoltage protection circuit in the second variation will be described with a focus on a difference between the above-described embodiment and the second variation.

In FIG. 3, the overvoltage protection circuit 3 an the second variation comprises a switching circuit 30 instead of the MOSFET 16. Further, the overvoltage protection circuit 3 in the second variation comprises an output ground terminal 36. The to-be-protected circuit 4 is connected to the output end 12 and to the output ground terminal 36. The voltage supplied from the AC adaptor 5 is supplied to the to-be-protected circuit 4 via the output end 12, and a ground potential is supplied from the output ground terminal 36.

The switching circuit 30 comprises a third resistance element 31, a fourth resistance element 32, a transistor 33, a fifth resistance element 34 and a MOSFET 35. One end of the third resistance element 31 is connected to the voltage output terminal of the voltage detection integrated circuit 15. The fourth resistance element 32 is connected between the other end of the third resistance element 31 and the input end 11. The transistor 33 is a PNP-type transistor whose emitter terminal is connected to the input end 11 and whose base terminal is connected to said other end of the third resistance element 31. The third resistance element 31, the fourth resistance element 32 and the transistor 33 form a circuit that inverts, between Low level and High level, the voltage outputted from the voltage output terminal of the voltage detection integrated circuit 15, and then outputs a resultant voltage from a collector terminal of the transistor 33.

One end of the fifth resistance element 34 is connected to the collector terminal of the transistor 33, and the other end of the fifth resistance element 34 is grounded. The MOSFET 35 is an N-type MOSFET. A source terminal of the MOSFET 35 is connected to the input end 11; a drain terminal thereof is connected to the output ground terminal 36; and a gate terminal thereof is connected to the collector terminal of the transistor 33.

Next, operations of the overvoltage protection circuit 3 in the second variation wall be described. Since operations, which are performed until the detection signal as outputted from the voltage detection integrated circuit 15, are the same as those described in the above embodiment, the descriptions thereof will be omitted. In the second variation, when the voltage Vo at the voltage output terminal is Low level (=0), an electric current flows between the base terminal and the emitter terminal of the transistor 33, whereby the emitter terminal and the collector terminal are caused to be in a state of conductivity with each other. As a result, a positive voltage is applied to the gate terminal of the MOSFET 35. This causes the source terminal and the drain terminal to be in a state of conductivity with each other (i.e., the switch becomes an open state). Accordingly, a potential of the output ground terminal 36 becomes a ground potential, and the voltage is supplied to the to-be-protected circuit 4.

On the other hand, in the case where the voltage Vo at the voltage output terminal is High level in the second variation (i.e., having an equal voltage value to the input end voltage value), an electric current does not flow between the base terminal and the emitter terminal of the transistor 33, and the emitter terminal and the collector terminal are caused to be in a state of nonconductivity with each other. Consequently, a voltage is not applied to the gate terminal of the MOSFET 35, whereby the source terminal and the drain terminal of the MOSFET 35 are caused to be in a state of non-conductivity with each other (i.e., the switch becomes a closed state). Accordingly, the output ground terminal 36 becomes an open state, and the voltage is not supplied to the to-be-protected circuit 4.

Note that, in the second variation, also in the case where the voltage output terminal becomes an open state, the transistor 33 operates in the same manner as in the case where the voltage at the voltage output terminal is High level. Therefore, in the second variation, the voltage detection integrated circuit 15 may be either a totem-pole output circuit or an open-output circuit.

As described above in the second variation, the switching means, which supplies/cuts off the voltage to the to-be-protected circuit 4 in accordance with the detection signal provided from the voltage detection integrated circuit 15, may be structured with a circuit in which an N-type MOSFET is used. Alternatively, in other embodiments, the switching means may be structured with a circuit in which a different field effect transistor from the MOSFET, such as a JFET or the like, is used. Further alternatively, the switching means may be structured with a circuit in which a bipolar transistor is used.

(Other Variations)

In the above embodiment and variations, a capacitor may be connected between the source terminal and the gate terminal of the MOSFET (MOSFET 16 or 35). Here, in the case where an overvoltage higher than the allowable voltage value is applied to the input end 11, there is a possibility that the MOSFET becomes a conductive state during a period from a point when the overvoltage starts to be applied to the input end 11 to a point when the overvoltage of the voltage detection integrated circuit become stable (i.e., to a point when the voltage at the voltage output terminal becomes High level). If the MOSFET becomes a conductive state, the overvoltage is, although temporarily, supplied to the to-be-protected circuit 4. However, by providing the aforementioned capacitor, the MOSFET can be prevented from becoming a conductive state during the above period. Accordingly, even in the above period, the overvoltage can be prevented from being supplied to the to-be-protected circuit 4.

Still further, in the above-described embodiment and variations, the zener diode is used as voltage drop means for protecting the voltage detection integrated circuit 15 from overvoltage. However, in other embodiments, the voltage drop means may be of any type as long as the voltage drop means is an element or circuit which causes, when an equal or higher voltage than a predetermined limit voltage value is applied to both ends thereof, a voltage drop by the predetermined limit voltage value and which allows, when a voltage lower than the limit voltage value is applied to both the ends, almost no electric current to flow between both the ends. For example, the voltage drop means may be a circuit in which one or more diodes are serially connected, or may be a varistor. Further, in the above-described embodiment and variations, the first resistance element 14 is used as an example of resistance means connected between the voltage drop means and the ground terminal. However, the resistance means may be of any type as long as the resistance means causes a voltage drop by a value of a voltage applied to both ends thereof. For example, the resistances means may be of any type as long as the resistance means causes a voltage drop corresponding to a magnitude of an electric current flowing thereon. Still further, although the above embodiment and variations describe examples in which the overvoltage protection circuit is incorporated into a power supply input unit within an electronic device, the overvoltage protection circuit may be incorporated into an AC adaptor. Alternatively, for example, the overvoltage protection circuit of the present invention may be used, within the to-be-protected circuit, at a portion which particularly needs to be protected from overvoltage, As described above, the present invention is applicable as, e.g., an overvoltage protection circuit or an electronic device comprising the overvoltage protection circuit, for the purpose of, for example, securely preventing, in the overvoltage protection circuit using a voltage detection integrated circuit, an overvoltage from being supplied to a circuit to be protected.

While the invention has been described in detail, the foregoing description is in all aspects illustrative and not restrictive. It is understood that numerous other modifications and variations can be devised without departing from the scope of the invention.

What is claimed is:

1. An overvoltage protection circuit for preventing a voltage higher than an allowable voltage value from being supplied to a predetermined to-be-protected circuit, the overvoltage protection circuit comprising:
   an input end to which a voltage is applied from outside the overvoltage protection circuit;
   a voltage drop device, whose one end is connected to the input end, for causing, when a voltage no lower than a predetermined limit voltage value is applied to both ends of the voltage drop device, a voltage drop by the predetermined limit voltage value;
   a first resistance device, connected between another end of the voltage drop device and a ground terminal, for causing a voltage drop by a value of a voltage applied to both ends of the first resistance device;
   a voltage detection integrated circuit for detecting a voltage between both the ends of the voltage drop device, and outputting a detection signal which indicates whether or not the detected voltage is higher than the allowable voltage value; and
   a switching device for, when the detection signal indicates that the detected voltage is no higher than the allowable voltage value, supplying the to-be-protected circuit with the voltage applied to the input end, and for, when the detection signal indicates that the detected voltage is higher than the allowable voltage value, ceasing a supply, to the to-be-protected circuit, of the voltage applied to the input end,
   wherein the predetermined limit voltage value is set to be greater than the allowable voltage value and to be no greater than a withstanding voltage of the voltage detection integrated circuit, and
   wherein a voltage value between both ends of the first resistance device when there is no electric current flowing into the voltage drop device is at least smaller than a detection error of the voltage detection integrated circuit.

2. The overvoltage protection circuit according to claim 1, wherein the voltage drop device is a zener diode.

3. The overvoltage protection circuit according to claim 1, wherein
   when the detected voltage is no higher than the allowable voltage value, the voltage detection integrated circuit outputs a lower voltage than a voltage value at the input end, and when the detected voltage is higher than the allowable voltage value, the voltage detection integrated circuit outputs a voltage equal to the voltage value at the input end, and
   the switching device, whose control terminal is connected to an output end of the voltage detection integrated circuit, causes the input end and an output end of the overvoltage protection circuit, which output end is connected to the to-be-protected circuit, to be in a state of conductivity with each other when a voltage at the control terminal is lower than the voltage at the input end, and causes the input end and the output end of the overvoltage protection circuit to be in a state of nonconductivity with each other when the voltage at the control terminal is equal to the voltage at the input end.

4. The overvoltage protection circuit according to claim 1, wherein
   when the detected voltage is no higher than the allowable voltage value, the voltage detection integrated circuit outputs a lower voltage than a voltage value at the input end, and when the detected voltage is higher than the allowable voltage value, the voltage detection integrated circuit causes an output thereof to be in an open state, and
   the switching device, whose control terminal is connected to an output end of the voltage detection integrated circuit, causes the input end and an output end of the overvoltage protection circuit, which output end is connected to the to-be-protected circuit, to be in a state of conductivity with each other when a voltage at the control terminal is lower than the voltage at the input end, and causes the input end and the output end of the overvoltage protection circuit to be in a state of nonconductivity with each other when the voltage at the control terminal is equal to the voltage at the input end,
   the overvoltage protection circuit further comprising a second resistance device, connected between the input end of the overvoltage protection circuit and the output end of the voltage detection integrated circuit, for causing a voltage drop in accordance with a magnitude of an electric current flowing into the second resistance device.

5. The overvoltage protection circuit according to claim 1, wherein the switching device is a field effect transistor.

6. An electronic device comprising the overvoltage protection circuit according to claim 1.

7. The overvoltage protection circuit according to claim 1, wherein a resistance value of the first resistance element is set such that a power consumption at the voltage drop device and a power consumption at the first resistance element falls within an absolute maximum rated power for both the first resistance element and the voltage drop device.

8. The overvoltage protection circuit according to claim 1, wherein the allowable voltage value is less than a maximum operating voltage of the voltage detection integrated circuit.

* * * * *